(12) United States Patent
Poggel et al.

(10) Patent No.: US 9,199,347 B2
(45) Date of Patent: Dec. 1, 2015

(54) DEVICE FOR MOUNTING FLEXIBLE, PROFILED HOLLOW CYLINDERS UNTO CYLINDRICAL ELEMENTS

(71) Applicant: BAYER INTELLECTUAL PROPERTY GMBH, Monheim (DE)

(72) Inventors: Martin Poggel, Köln (DE); Jörg Kauling, Bergisch Gladbach (DE); Sebastian Schmidt, Haan (DE); Erhard Beckers, Burscheid (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 14/337,737

(22) Filed: Jul. 22, 2014

(65) Prior Publication Data

US 2014/0373328 A1 Dec. 25, 2014

Related U.S. Application Data

(62) Division of application No. 13/201,313, filed as application No. PCT/EP2010/000648 on Feb. 3, 2010, now Pat. No. 8,869,371.

(30) Foreign Application Priority Data

Feb. 16, 2009 (DE) .......................... 10 2009 009 108

(51) Int. Cl.
*F16L 11/118* (2006.01)
*B23P 19/02* (2006.01)
(Continued)

(52) U.S. Cl.
CPC ............... *B23P 19/02* (2013.01); *B01J 19/123* (2013.01); *B01J 19/242* (2013.01); *B29C 65/66* (2013.01);
(Continued)

(58) Field of Classification Search
CPC ..... F16L 11/1185; F16L 11/20; F16L 11/118; B23P 11/02; B23P 19/02; B29C 66/53241; B29C 65/66; B29C 66/7465; B29C 66/52272; B29C 66/71; Y10T 29/53987; Y10T 29/49867; Y10T 29/49869; Y10T 29/49945; C02F 2201/004; C02F 1/325; B29L 2023/18; B01J 19/242
USPC ......... 29/450, 454, 455.11, 505, 525, 525.04; 250/453.11–455.11, 435–438
See application file for complete search history.

(56) References Cited

U.S. PATENT DOCUMENTS 1,531,973 A * 3/1925 Pugh ............................ 157/1.41
2,645,004 A * 7/1953 Dorner ............................ 29/450
(Continued)

FOREIGN PATENT DOCUMENTS

| CN | 1 531 973 A | 9/2004 |
|---|---|---|
| CN | 1531973 A * | 9/2004 |

(Continued)

OTHER PUBLICATIONS

DE 2061299; Corrugated Tube; English Machine Translation; pp. 1-10.*

(Continued)

*Primary Examiner* — Jermie Cozart
*Assistant Examiner* — Bayan Salone
(74) *Attorney, Agent, or Firm* — Norris McLaughlin & Marcus PA

(57) ABSTRACT

Device for mounting flexible, profiled hollow cylinders onto cylindrical elements. Profiled hollow cylinders which are mounted onto a cylindrical element form excellent modules for irradiating fluid media with electromagnetic radiation.

5 Claims, 7 Drawing Sheets

(51) Int. Cl.

| | | |
|---|---|---|
| *F16L 11/20* | (2006.01) | |
| *B23P 11/02* | (2006.01) | |
| *B29C 65/66* | (2006.01) | |
| *B29C 65/00* | (2006.01) | |
| *B01J 19/12* | (2006.01) | |
| *B01J 19/24* | (2006.01) | |
| *B29L 23/18* | (2006.01) | |
| *C02F 1/32* | (2006.01) | |

(52) U.S. Cl.
 CPC ....... *B29C 66/1122* (2013.01); *B29C 66/52272* (2013.01); *B29C 66/53241* (2013.01); *B29C 66/7465* (2013.01); *F16L 11/118* (2013.01); *F16L 11/1185* (2013.01); *F16L 11/20* (2013.01); *B01J 2219/0002* (2013.01); *B29C 66/71* (2013.01); *B29L 2023/18* (2013.01); *C02F 1/325* (2013.01); *C02F 2201/004* (2013.01); *Y10T 29/4987* (2015.01); *Y10T 29/49867* (2015.01); *Y10T 29/49869* (2015.01); *Y10T 29/49945* (2015.01); *Y10T 29/53987* (2015.01)

(56) References Cited

U.S. PATENT DOCUMENTS

| | | | | |
|---|---|---|---|---|
| 2,822,857 | A * | 2/1958 | Rothermel et al. | 156/144 |
| 2,912,075 | A * | 11/1959 | Pfistershammer | 52/834 |
| 3,101,962 | A * | 8/1963 | Nunlist | 403/368 |
| 3,547,160 | A * | 12/1970 | Larty | 138/121 |
| 4,126,927 | A * | 11/1978 | Woodward et al. | 29/450 |
| 4,573,251 | A * | 3/1986 | Hillyard | 29/450 |
| 4,599,784 | A * | 7/1986 | Canu et al. | 29/450 |
| 4,686,755 | A * | 8/1987 | Jensen | 29/450 |
| 4,769,131 | A * | 9/1988 | Noll et al. | 210/85 |
| 4,935,190 | A * | 6/1990 | Tennerstedt | 264/529 |
| 6,279,614 | B1 * | 8/2001 | Riesselmann et al. | 138/137 |
| 6,446,661 | B2 * | 9/2002 | Armenia et al. | 137/312 |
| 6,695,705 | B2 * | 2/2004 | Stervik | 464/79 |
| 7,420,183 | B2 * | 9/2008 | Kaiser et al. | 250/437 |
| 7,651,660 | B2 | 1/2010 | Kaiser et al. | |
| 7,695,675 | B2 * | 4/2010 | Kaiser et al. | 422/24 |
| 8,067,749 | B2 * | 11/2011 | Kauling et al. | 250/455.11 |
| 8,663,271 | B2 * | 3/2014 | Mantell | 606/213 |
| 8,869,371 | B2 * | 10/2014 | Poggel et al. | 29/450 |
| 2002/0096648 | A1 * | 7/2002 | Kaiser et al. | 250/492.1 |
| 2003/0049809 | A1 * | 3/2003 | Kaiser et al. | 435/173.1 |
| 2004/0248076 | A1 * | 12/2004 | Kaiser et al. | 435/2 |
| 2008/0033344 | A1 * | 2/2008 | Mantell | 604/27 |
| 2010/0229994 | A1 * | 9/2010 | Wildermuth et al. | 138/121 |
| 2011/0314655 | A1 * | 12/2011 | Poggel et al. | 29/525 |
| 2014/0200410 | A1 * | 7/2014 | Mantell | 600/208 |

FOREIGN PATENT DOCUMENTS

| | | | | |
|---|---|---|---|---|
| DE | 20 61 299 | A1 | 8/1972 | |
| DE | 2061299 | * | 8/1972 | F16L 11/12 |
| DE | 29 824 837 | U1 | 11/2002 | |
| DE | 102007047495 | A1 | 4/2009 | |
| EP | 1 464 342 | A1 | 10/2004 | |
| JP | H5-41873 | U | 6/1993 | |
| JP | 06313414 | A * | 11/1994 | F16B 13/14 |
| JP | H6-313414 | A | 11/1994 | |
| WO | 02/38191 | A | 5/2002 | |
| WO | 02/38502 | A | 5/2002 | |
| WO | 2005/003612 | A1 | 1/2005 | |
| WO | 2007/096057 | A2 | 8/2007 | |
| WO | 2008/015566 | A | 2/2008 | |
| WO | WO 2008015566 | A2 * | 2/2008 | A61B 17/34 |

OTHER PUBLICATIONS

International Search Report Dated Mar. 31, 2010.
DE 2061299; EPO English Machine Translation; pp. 1-10.

* cited by examiner (I)

(II)

DEVICE FOR MOUNTING FLEXIBLE, PROFILED HOLLOW CYLINDERS UNTO CYLINDRICAL ELEMENTS

This is a Division of application Ser. No. 13/201,313 filed Sep. 15, 2011, now U.S. Pat. No. 8,869,371, issued Oct. 28, 2014, which is a 371 of PCT/EP2010/000648 filed Feb. 3, 2010, claiming priority of German Application DE 10 2009 009 108.4 filed Feb. 16, 2009, the disclosure of which is incorporated herein by reference.

The present invention relates to a device and a method for mounting flexible, profiled hollow cylinders onto cylindrical elements. Profiled hollow cylinders mounted on cylindrical elements form modules suitable for irradiating fluid media with electromagnetic radiation. The present invention therefore also relates to a method of producing irradiation modules and to irradiation modules produced by the method according to the invention.

A cylinder is an object bounded by two parallel flat surfaces (the bottom and top end surfaces) and a shell formed by parallel straight lines. It is formed by shifting a flat surface or curve along a straight line which is not in the same plane. A special embodiment of a cylinder is a circular cylinder, which is formed by shifting a circle parallel to a straight line through the centre point of the circle, said straight line not being located in the plane of the circle. A circular cylinder is bounded by two parallel circular surfaces (the bottom and top end surfaces) and the so-called shell.

In the present context and hereinbelow a hollow cylinder is understood to be a special embodiment of a cylinder which is characterized in that a channel runs from the bottom end surface to the top end surface parallel to the shell. A pipe is an example of a hollow cylinder.

A flexible hollow cylinder is understood to be a hollow cylinder which can be bent and/or stretched to a certain degree. The degree of stretching and/or bending is at least 1% of the length and/or diameter of the hollow cylinder. One example of a flexible hollow cylinder is a tube.

A profiled hollow cylinder is understood to be a hollow cylinder which has a profile along its shell. This profile can be, for example, corrugated or spiral. Examples of profiled hollow cylinders are corrugated tubes and corrugated pipes as well as spiral tubes and spiral pipes.

A flexible, profiled hollow cylinder is characterized in that it can be stretched to a certain degree (by at least 1%, and preferably 5 to 20%, of the length and/or diameter of the hollow cylinder) along its longitudinal axis.

BACKGROUND OF THE INVENTION

Flexible, profiled hollow cylinders play a major role in many areas of technology. In the automotive industry and in the mechanical and plant engineering and medical technology sectors corrugated tubes are used for protecting and bundling together electrical or other lines and for obtaining flexible connections to peripheral apparatuses. In the electroinstallation field, plastic corrugated tubes are used predominantly as or instead of so-called empty tubes both for outdoor use and, above all, in the walls and ceilings of buildings. Corrugated tubes are used as heat exchangers (when made, for example, of stainless steel in buffer storage units or of plastic for underfloor heating systems). In such applications the corrugated structure is used for increasing the surface area for obtaining maximum heat transfer. Corrugated tube sections (metal bellows) are used for compensating offset axes or for compensating changes in lengths and angles.

Applications WO-A 02/38502, WO-A 02/38191, WO-A 07/096,057 and EP-A 1464342 describe the use of spiral tubes in devices for irradiating liquid media for sterilization purposes.

In many of the abovementioned applications and uses, and in particular in the use of profiled hollow cylinders in irradiation devices, the profiled hollow cylinders are mounted onto cylindrical elements. In WO07/096,057A2, for example, a so-called irradiation module is described which is characterized in that a spiral tube is mounted onto an inner supporting tube in a form-fitting manner. As a result, a channel is formed between the supporting tube and the spiral tube which runs helically from one end of the spiral tube around the supporting tube to the other end of the spiral tube. Such a device is very useful for irradiating fluid media flowing through the channel. For this purpose one or more radiation sources are arranged in the supporting tube and/or around the spiral tube, which irradiate the medium flowing through the channel preferably with UV radiation, and particularly preferably with UVC radiation. The irradiation produces a reduction in microorganisms and/or viruses or a chemical reaction in a photochemical reactor.

The special feature of the perfused channel is the intense, uniform transverse mixing over the entire length of the channel vertically to the main direction of the product flow and a residence time distribution narrowed by turbulent product flow. Transverse mixing guarantees that those fluid layers farther away from the source of radiation, which do not receive any or only a small amount of UV radiation, particularly in the case of highly light-absorbing media, undergo an intense exchange with the UV-radiated layers near the radiation source. This feature and the narrow residence time distribution means that all of the fluid elements undergo a uniform and consistent radiation duration and intensity, which can be adapted to individual requirements by means of the rate of flow and the intensity of the radiation source. The above features guarantee that an effective reduction in microorganisms and/or viruses occurs in the medium. In the case of media which could be damaged by too high a degree of radiation, the risk of the occurrence of too high exposure to radiation and thus partial damage due to an unfavourably broad residence time distribution is effectively reduced.

For this purpose it is however necessary for the spiral tube to surround the supporting tube in a form-fitting manner, thus ensuring that only one single channel is formed which runs helically around the supporting tube. Transverse flows between adjacent channel coils must be avoided, since this would lead to a broadening of the residence time distribution.

In EP-A 1464342 the channel is formed by pulling a spiral tube onto a cylindrical supporting element. By means of a suitable geometry for the spiral tube, which has an inner diameter slightly smaller than that of the supporting element, a tight, form-fitting bond is produced between the two elements. This makes it possible to prevent axial by-pass flows otherwise caused by gaps between the channel coils and the corresponding broadening of the residence time distribution.

The mounting of a flexible, profiled hollow cylinder onto a cylindrical element does, however, represent a technical problem, especially if the smallest inner diameter of the profiled hollow cylinder is smaller than or equally as large as the outer diameter of the cylindrical element.

Due to the profiled contour of its shell, a profiled hollow cylinder has a number of narrow areas (in the present context also referred to as coils) which have to be overcome when mounting it onto a cylindrical element. The mounting process is usually carried out in such a manner that the cylindrical element is pushed into the channel of the profiled hollow cylinder and/or the profiled hollow cylinder is pulled onto the cylindrical element. For each coil in the hollow cylinder which has already been mounted onto the element, an increase in friction occurs between the hollow cylinder and the cylindrical element, so that the force which has to be exerted on the hollow cylinder and/or the element, increases as the length of the hollow cylinder increases.

Depending on the materials used for the hollow cylinder and the cylindrical element the components can become worn, torn or scratched or can even break.

In addition, the process of "pulling" a spiral tube onto a cylindrical supporting element described in EP-A 1464342 for the production of an irradiation device results in indefinite channel geometries. The pulling-on process and the stresses resulting therefrom can have an effect on the spiral geometry. Individual coils can be crushed. Constricted areas in individual channel coils lead to drops in pressure. Due to the crushing of individual channels, gaps between adjacent channel coils can hardly be avoided. This results in a non-reproducible irradiation device with non-specific dimensions. In addition, too high friction can also cause particles to be rubbed off. These particles are critical for various applications, such as for example in the pharmaceutical sector.

The need therefore exists for a method of mounting flexible profiled hollow cylinders onto cylindrical elements which can be carried out easily and keeps the mechanical stresses on the components at such a low level that wear and/or even the destruction of the components cannot take place.

In addition, the need exists for a method of mounting flexible profiled hollow cylinders onto cylindrical elements which can be carried out on an industrial scale.

In particular, the at least partial automatization of the process is of enormous importance in this regard in order, for example, to be able to produce the irradiation devices described in applications WO-A 02/38502, WO-A 02/38191, WO-A 07/096,057 and EP-A 1464342 cost-effectively and reproducibly on an industrial scale.

Based on the known prior art, the object is therefore to provide a method of mounting flexible, profiled hollow cylinders onto cylindrical elements without any of the components being thereby damaged. The method sought should be capable of being at least partially automated. It should be capable of being carried out simply and at low cost. The object is also to provide a device for carrying out the desired method. The device sought should be capable of being operated intuitively and should also be cost-effective.

The method sought should allow the reproducible production of irradiation devices which have well-defined channel geometries and which therefore produce effective and reproducible results in the irradiation of fluid media with electromagnetic radiation, for example for the purpose of inactivating microorganisms and/or viruses by means of UV radiation.

Surprisingly it has been found that flexible, profiled hollow cylinders can be easily mounted onto a cylindrical element if the profiled hollow cylinders are elongated (i.e. axially stretched) along their longitudinal axis.

SUMMARY OF THE INVENTION

The present invention therefore relates to a method of mounting a flexible, profiled hollow cylinder onto a cylindrical element, which comprises at least the following steps:
(a) elongating the hollow cylinder along its longitudinal axis,
(b) inserting the element into the elongated hollow cylinder,
(c) relaxing the hollow cylinder.

The method according to the invention can be used for flexible, profiled hollow cylinders whose profiled contour consists at least partially of corrugations or grooves which do not run in the direction of the longitudinal axis. Examples of such flexible, profiled hollow cylinders are depicted schematically in FIG. 1. Other profiled contours are conceivable.

DETAILED DESCRIPTION

The elongation of the hollow cylinder means that it is stretched along its longitudinal axis and its length is thereby increased. According to the invention, the degree of this elongation is 1% to 30%, preferably 5% to 20%, and particularly preferably 10 to 15%, and the length of the hollow cylinder is therefore increased by the percentage stated. Surprisingly it has been found that, by elongating according to the invention, the smallest inner diameter of the hollow cylinder formed by the coils/narrow areas of the profiled contour is increased in size. If the hollow cylinder is elongated beyond a threshold percentage the smallest diameter may decrease again in size. This threshold percentage is dependent on the material and the profiled contour concerned. It can be determined by simple empirical calculations. Also, if the profiled hollow cylinder is elongated to too great an extent it may be damaged. Excessive elongation should therefore be avoided. In order to minimize the stresses on the material of the profiled hollow cylinder the period of time employed for the elongation should be minimized. The optimum duration of the elongation time can be calculated empirically for each individual case. The parameters which determine the optimum elongation time are, for example, the material employed, the thickness and length of the hollow cylinder, the temperature, the throughput rate and many other factors. Preferably the elongation according to the invention in step (a) is not carried out for longer than two minutes if the elongated hollow cylinder is made of PTFE (polytetrafluoroethylene) and is processed at room temperature (from 15° C. to 25° C.).

The elongation of the hollow cylinder according to the invention can be carried out by fixing the hollow cylinder at one end and gripping it at its other end and stretching it. The hollow cylinder can for example be suspended at one end. A certain degree of elongation already takes place as a result of the inherent weight of the hollow cylinder. By attaching weights to and/or by pulling the other end, this elongation can be increased. The cylindrical element can be inserted into the elongated hollow cylinder from the top or from the bottom.

Preferably elongation is carried out by gripping the hollow cylinder at at least one point, and preferably at at least two points. Preferred points at which to grip the hollow cylinder are its two ends. If the hollow cylinder is gripped at two points, one (the first) gripping point can be held, while the other is moved away from the first. This produces elongation of the hollow cylinder. It is also possible for both gripping points to move away from each other.

In a preferred embodiment of the method according to the invention, the hollow cylinder is gripped at several points along its length. The gripping points are preferably uniformly distributed over the length of the hollow cylinder. Preferably gripping points are located at the two ends of the hollow cylinder.

The optimum number of gripping points depends on the length, shape and material of the hollow cylinder and it can be calculated empirically. In a preferred embodiment, the distance between two neighbouring gripping points is from 300 mm to 500 mm when using a PTFE spiral tube with a diameter from 5 to 20 cm as the profiled hollow cylinder.

When inserting the cylindrical element into the elongated hollow cylinder in step (b) of the method according to the invention it is irrelevant whether the element is pushed into the hollow cylinder or whether the hollow cylinder is pulled or pushed onto the element or whether a combination of these movements and forces is employed. An appropriate device ensures that the element and the hollow cylinder reach a predetermined position in relation to each other (see the example hereinbelow). When in the following it is stated that the hollow cylinder is pulled or pushed onto the element or the element is pushed or pulled into the hollow cylinder, this is always understood to refer to a force and a resulting relative movement between the hollow cylinder and the element which brings the hollow cylinder and the element into a predetermined position in relation to each other.

In a preferred embodiment, step (b) is carried out using a so-called centering device or insertion aid. In one preferred embodiment of the method according to the invention the centering device or insertion aid is a mounted piece which is attached to that end of the cylindrical element which is introduced first into the hollow cylinder. The element to be inserted may possibly have sharp edges which could scrape and/or scratch and/or cut the coils/narrow areas of the profiled contour of the hollow cylinder during the insertion of the element into the hollow cylinder. It is not always possible to orientate the entire length of the elongated hollow cylinder in line with its longitudinal axis. If the elongated hollow cylinder is arranged in a horizontal position the flexible hollow cylinder may possibly hang downwards slightly between two gripping points. On inserting the cylindrical element it could knock against coils/narrow areas and cause damage. This is effectively prevented by the use of a centering device or an insertion aid which is preferably conical in shape and guides the element to be inserted. An example of a centering device or insertion aid is depicted in FIG. 5.

In step (c) the force for elongating the hollow cylinder ceases to be exerted and the hollow cylinder relaxes and its length decreases. Due to this relaxation the smallest diameter of the hollow cylinder decreases again and the hollow cylinder surrounds the cylindrical element.

Step (c) takes place as uniformly as possible over the entire length of the hollow cylinder, so that no stresses are produced inside the profiled hollow cylinder. The hollow cylinder should be mounted onto the cylindrical element in a uniform and even manner. This is achieved particularly effectively by using so-called matrices which guide the relaxation process and facilitate the adjustment between the hollow cylinder and the cylindrical element. In a preferred embodiment the matrices have a "negative" profile to that of the hollow cylinder profile. This ensures that a maximum contact surface is formed and the forces for elongation and adjustment can be transmitted uniformly to the profiled hollow cylinder.

It may be pointed out that a modified form of the method according to the invention can also be used for inserting a flexible, profiled hollow cylinder into another hollow cylinder. By elongating the profiled hollow cylinder according to the invention, not only is its smallest inner diameter increased, but surprisingly its largest outer diameter is also decreased. If a flexible, profiled hollow cylinder is to be inserted into a hollow cylinder whose inner diameter is smaller than the largest outer diameter of the profiled hollow cylinder, the elongation method according to the invention allows this insertion to take place easily, with only a low degree of force and with the avoidance of damage to the hollow cylinders. The considerations and solutions provided in the present specification can therefore also be applied to this technical problem.

Surprisingly it has been found that the method according to the invention for mounting flexible, profiled hollow cylinders onto cylindrical elements is highly suitable for the production of irradiation devices. An irradiation device is understood to be a device which is perfused by a fluid medium which is exposed to electromagnetic radiation. If UV radiation is used, such an irradiation device can be used for example for reducing microorganisms and/or viruses in fluid media. If IR radiation is used, such an irradiation device can for example be used for heating a fluid medium. Additional applications are also conceivable, such as for example as reactors for processes which are activated and/or take place photochemically.

In a preferred embodiment of the method according to the invention, a spiral tube is used as the flexible, profiled hollow cylinder. This spiral tube consists preferably of a plastic, e.g. PTFE (perfluoroethylene). The cylindrical element used is preferably a tube which is transparent for electromagnetic radiation. Preferably a quartz glass tube is used which is transparent for UV radiation. The method according to the invention is particularly suitable for producing such irradiation devices—hereinafter also referred to as irradiation modules, which are characterized in that a spiral tube is mounted on a supporting tube in such a manner that a press fit exists between the spiral tube and the supporting tube. A press fit is understood to be when the smallest inner diameter of the spiral tube in its force-free state is smaller than the outer diameter of the cylindrical element. By means of the elongation according to the invention the smallest inner diameter of the spiral tube is increased and reaches a size which is larger than that of the outer diameter of the supporting tube. This allows the simple insertion of the supporting tube into the spiral tube without any excessive application of force and thus without any damage to the tube and the supporting tube. If the elongation process is terminated, the smallest inner diameter of the tube decreases in size and the coils of the tube surround the quartz glass tube in a positive/form-fitting and uniform manner. Due to the press fit the coils exert pressure on the quartz glass, so that the tube cannot slide off the quartz glass tube. In addition, no by-pass flow takes place between adjacent helical coils during the use of the irradiation modules. A channel is reproducibly formed which has a uniform cross-section over its entire length and which runs helically around the supporting tube.

The present invention therefore also relates to a method of producing irradiation modules as well as to irradiation modules which have been produced by the method according to the invention. The irradiation modules according to the invention can be used, for example, for irradiating fluid media for sterilization purposes and/or for virus inactivation.

The sterilization of, or the reduction of germs in, fluid media is an important step in many processes. Contamination with active, i.e. reproducible, biological material, such as microorganisms or viruses, frequently poses a risk to product safety, which must be effectively counteracted.

Germ reduction by inactivation with ultraviolet radiation, and in particular with UVC radiation, especially of a wavelength of about 254 nm, has been known for a long time and is used in practice for many applications. Examples include not only the sterilization of surfaces but also the treatment of liquid media such as drinking water and effluents. A major technical challenge exists if the media contain not only microorganisms which need to be inactivated but also valuable materials which can also be damaged to a certain degree by the radiation. Such challenges are typical for sterilization processes in the food sector and in the field of biopharmaceutical liquids, such as for example protein solutions. Additional problems arise when the opacity of the processed liquid is high in the UVC radiation range and the depth of penetration of the inactivating radiation is low. Such applications demand technical systems which provide homogeneous irradiation, i.e. a narrow dose distribution, despite the high degree of opacity. Where devices are perfused, a certain residence time in the irradiation zone, i.e. a certain irradiation time, must be additionally provided. A system-based residence time distribution also produces a broad, i.e. inhomogeneous, dose distribution in the liquid.

The irradiation module according to the invention for the irradiation of fluids with electromagnetic radiation includes a UV-transparent cylindrical tube (a cylindrical element) for holding a centrally arranged, longitudinally shaped radiation source and a spiral tube (a profiled hollow cylinder) mounted onto the cylindrical tube, so that between the spiral tube and the cylindrical tube, one or more spiral channels are formed, depending on the profiled contour concerned, in which a processed fluid can be irradiated during its residence time in the irradiation zone.

A spiral channel forces the perfusing fluid to flow helically. The special characteristic of the perfused channel is intense, uniform transverse mixing (produced by so-called Dean vortices) which prevails over the entire length vertical to the main direction of the product flow—even in the case of laminar flow conditions. This guarantees that those layers of liquid which are farther away from the radiation source and which do not receive any or only a slight degree of UV radiation, in particular in the case of highly light-absorbing media, undergo an intense exchange with the UV-radiated layers close to the radiation source.

Particularly preferably such a channel has a (preferably rounded-corner) rectangular or trapezoidal or semicircular cross-sectional profile. A channel has a cross-sectional profile in particular with a depth of 1 to 100 mm, preferably 2 to 50 mm, and an average width of 1 to 200 mm, preferably 2 to 50 mm.

A very particularly preferable design for the profiled hollow cylinder is one in which the profiled contour consists of a single channel running spirally along the interior of the shell at a pitch (pitch angle) of 2 to 20°, and preferably 4 to 10°.

The material of the tube through which the liquid is irradiated should be substantially transparent to radiation. Depending on the wavelength range of the electromagnetic radiation, suitable materials are for example glass or plastics. The material which forms the channel and is not permeated by radiation should be, in particular, dimensionally stable. Suitable materials are for example metallic materials, plastics, ceramics, glass or composite materials. If this material is at least substantially transparent for the electromagnetic radiation employed, the liquid concerned can also be additionally or alternatively irradiated from the exterior through this component. An additional embodiment can consist of a reflective coating on the inside of the profiled hollow cylinder, thus resulting in reflection of the radiation and thus intensification of the radiation in the irradiation zone.

In a preferred embodiment, the irradiation module according to the invention is obtained by mounting a spiral tube made of PTFE onto a supporting tube which is transparent to UV radiation, the smallest inner diameter of the spiral tube, in the form of the inner coils, being slightly smaller than the outer diameter of the supporting tube. "Slightly smaller" is understood to mean that the smallest inner diameter of the spiral tube is 0.01% to 5%, and preferably 0.1% to 3%, smaller than the outer diameter of the supporting tube. As a result, a tight, force-fitting bond between the two elements of the irradiation module (i.e. a press fit) is produced. This makes it possible to prevent the axial by-pass flows otherwise caused by gaps between the flow channels and resulting in a marked broadening of the residence time distribution. Swelling of the spiral tube as a result of the increasing pressure drop caused by more voluminous product streams is undesirable due to the formation of by-pass flows and is prevented, for example, by the spiral tube having a correspondingly sized wall thickness and/or by means of metal reinforcements embedded in the spiral tube and/or by means of an outer jacket. A jacket tube (an outer jacket) is advantageously designed in such a manner that the inner diameter of the jacket is slightly smaller than the outer diameter of the tube, in order to produce additional contact pressure without any significant deformation of the tube. Where only small pressure drops occur, a shrinkable tube, which is easily mounted onto the corrugated tube, can improve the pressure stability.

The radiation is introduced via a longitudinal radiation source inserted centrally into the supporting tube or from the exterior using radiation sources arranged around the spiral tube. Preferably irradiation is carried out by a radiation source fitted inside the supporting tube. For treatment with UVC radiation the supporting tube is preferably designed as a quartz tube transparent to UVC radiation. Since it is difficult to clean the channels due to their poor accessibility, the irradiation modules according to the invention are, in a preferred embodiment, designed as disposable elements packed in a sterile or low-germ form. Disposable systems are used particularly widely in the biopharmaceutical industry, since complicated cleaning validations are avoided by the use of disposable systems. Such disposable systems are required to be capable of being produced cost-effectively and to be of reproducible quality. In this regard, quality refers in particular to uniform dimensions and uniform surface properties of the supporting tube (no sliding agents, no film, no scratches). The irradiation modules according to the invention meet these demands, since the method according to the invention of producing irradiation modules produces reproducible results, is capable of being carried out automatically and thus on an industrial scale and is cost-effective and requires no sliding agents.

The irradiation modules according to the invention are therefore recommended for use according to the invention as cleanroom-packed, certified, quickly and easily replaceable disposable modules for use in GMP-controlled biopharmaceutical or food processes (GMP=Good Manufacturing Practice).

The irradiation modules according to the invention also have at least two connections for introducing and discharging a fluid into/from the helical irradiation chamber. Examples of how a spiral tube on a supporting element can be provided with connections can be found in EP 1464342 A1.

The present invention also relates to a device for mounting flexible, profiled hollow cylinders onto cylindrical elements. The device according to the invention has means for gripping a flexible, profiled hollow cylinder at one or more points, means for elongating the hollow cylinder and means for inserting the element into the profiled hollow cylinder.

The hollow cylinder is preferably gripped at at least two points. The means for gripping the hollow cylinders (the gripping elements) grip a hollow cylinder preferably at its ends. In a particularly preferred embodiment, additional gripping elements are preferably uniformly distributed over the length of the hollow cylinder. All gripping elements, or all gripping elements apart from one, are movable so that, after gripping the hollow cylinder, they can be moved in relation to each other and the hollow cylinder can thus be stretched (elongated) along its longitudinal axis. The gripping elements are moved, for example, by means of stepping motors or the like.

In a preferred embodiment, the device according to the invention has locators which determine the position of each gripping element, so that elongation and/or adjustment and/or relaxation take place in a regulated manner.

The means for inserting the cylindrical element into the profiled hollow cylinder consists, for example, of a motor-driven pushing rod which inserts the element, resting for example on supporting elements, into the hollow cylinder.

In a preferred embodiment, the device according to the invention also has temperature control means for guaranteeing constant processing conditions. It may also be advantageous to heat the profiled hollow cylinder prior to elongation and/or relaxation, in order, for example to increase its elasticity and thus prevent damage as a result of the elongation process.

In a preferred embodiment, the device according to the invention also has means for adjustment between the hollow cylinder and the cylindrical element. An example is shown in FIG. 6c.

In a preferred embodiment, the gripping elements and/or means for adjustment also have a profiled contour at the point of contact with the hollow cylinder, which corresponds to the negative contour of the profiled hollow cylinder. The width of such a receptacle should be at least one, preferably two to ten, and particularly preferably two to five, profile coils.

In a preferred embodiment, the device according to the invention also includes means for increasing the inner pressure within the profiled hollow cylinder in order to increase the smallest inner diameter of the profiled hollow cylinder. Increasing the pressure can be carried out to assist the elongation process.

Additional features of the device according to the invention are means for controlling the elongation and/or the adjustment of the profiled hollow cylinder and/or the insertion of the cylindrical element into the elongated hollow cylinder.

In the following, embodiment examples of the invention are explained in more detail by means of figures.

BRIEF DESCRIPTION OF THE DRAWINGS

In FIG. 4, view (a) the hollow cylinder is first of all elongated (as indicated by the horizontal white arrows). The smallest inner diameter D/ of the hollow cylinder in its relaxed state is preferably slightly less than or equal to the outer diameter $D_A$ of the cylindrical element. Due to the elongation, the smallest inner diameter increases to a size of $d_f$, which is greater than the outer diameter $D_A$ (FIG. 4, view (b)).

FIG. 4, view (b) shows how the cylindrical element can be easily inserted into the elongated hollow cylinder (as indicated by the thick black arrow).

In FIG. 4, view (c) the hollow cylinder is relaxed (as indicated by the white arrows) and becomes form-fittingly clamped around the cylindrical element in FIG. 4, view (d). In order not to damage the material used for the profiled hollow cylinder, and in particular if this is PTFE, the mounting process should preferably be completed in a few minutes, and preferably in considerably less than one minute, in order to avoid permanent deformations of the material and a corresponding reduction in the press fit.

Gripping element (50d) is used for gripping a profiled hollow cylinder between its ends. It has a contour which corresponds to the negative profile of the hollow cylinder. This contour is used for holding and fixing the hollow cylinder and also allows both the adjustment between the hollow cylinder and the inserted element and the uniform relaxation of the elongated hollow cylinder.

Figure 1:
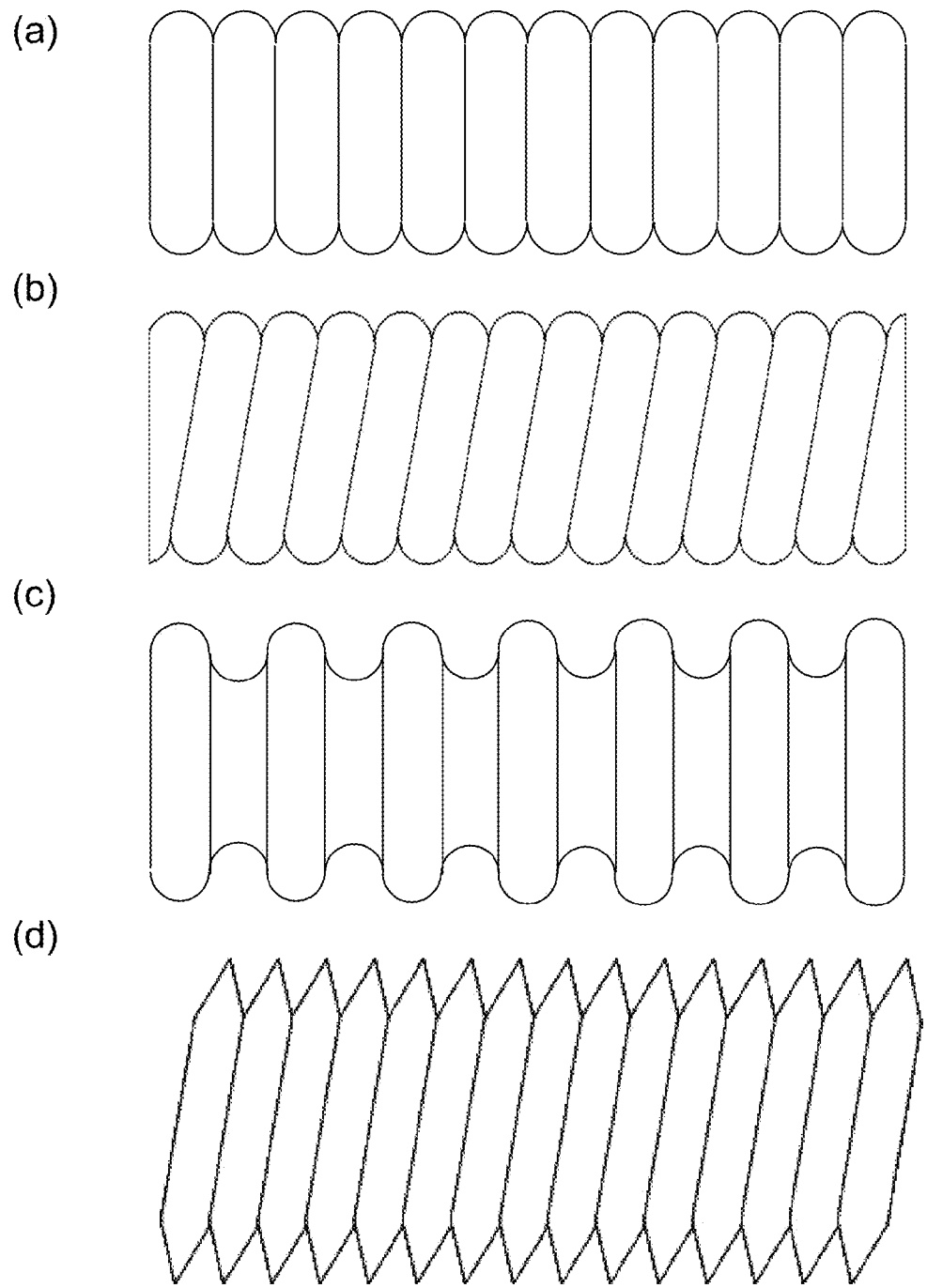
FIG. 1 schematically depicts side views of four examples of profiled hollow cylinders with different profiled contours: spiral coils (b, d) and corrugated coils (a, c). All of the hollow cylinders depicted have a profiled contour in the form of corrugations or grooves, which do not run in the direction of the longitudinal axis.
Figure 2:
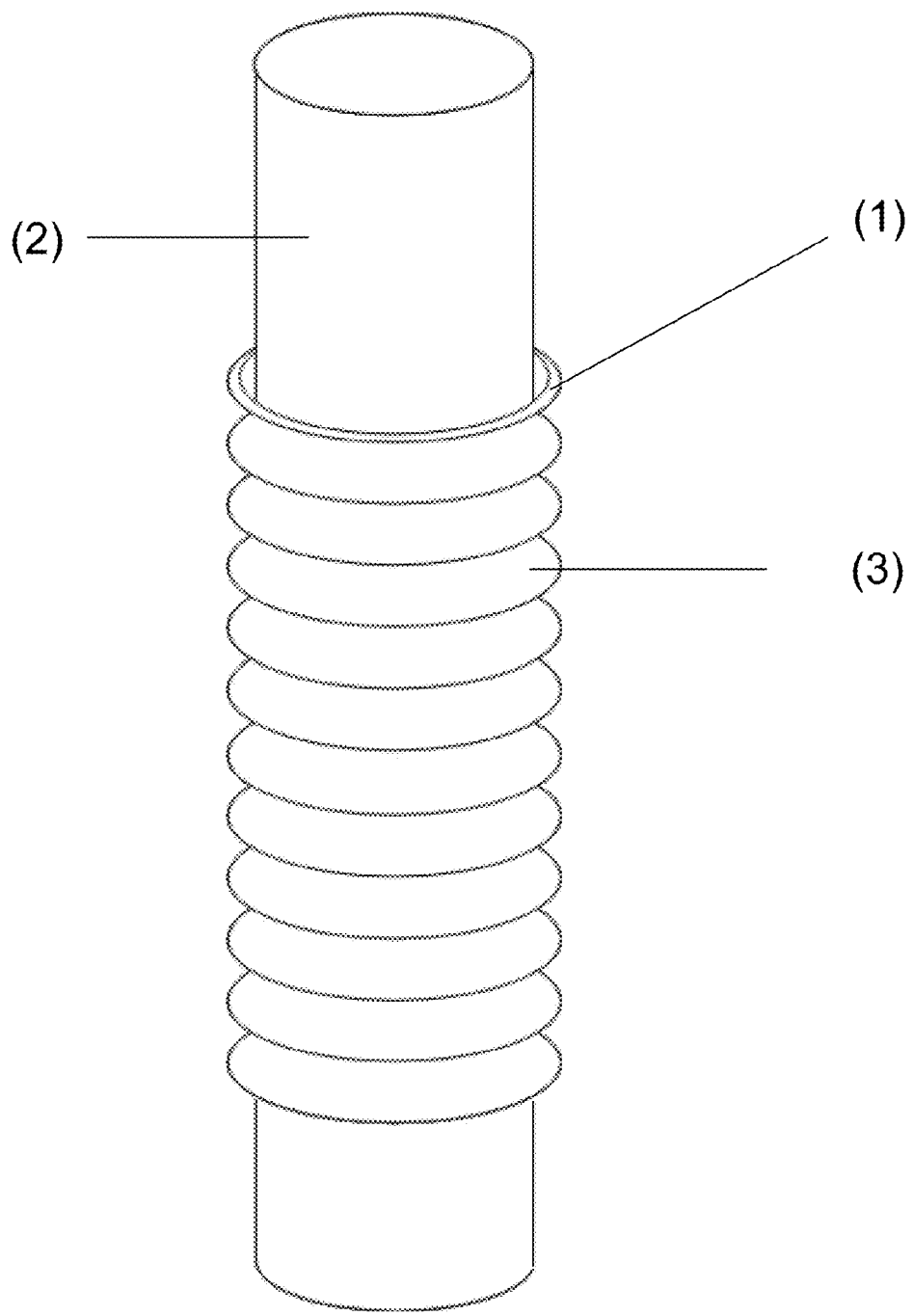
FIG. 2 schematically depicts a profiled hollow cylinder (1) which is applied to a cylindrical element (2). The profiled contour (3) consists of parallel, ring-shaped coils along the shell of the hollow cylinder.
Figure 3:
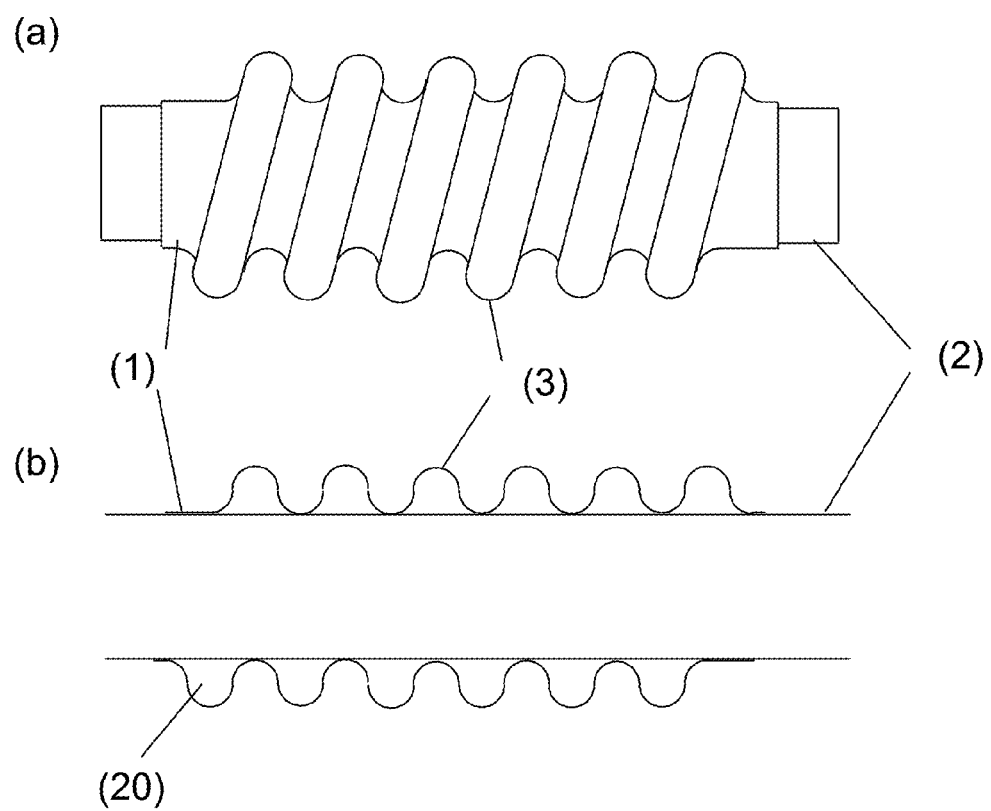
FIG. 3 schematically depicts an irradiation module according to the invention which comprises a spiral tube as the profiled hollow cylinder (1) and a cylindrical supporting tube (2): (a) viewed from the side and (b) viewed in cross-section from the side. The spiral profiled contour (3) produces, in conjunction with the press fit, a channel (20) which runs helically around the supporting tube. Gaps between adjacent coils of the channel are prevented by the press fit. WO2007/096057 contains examples which describe how the channel can be provided with connecting points for introducing and discharging fluid media.
Figure 4:
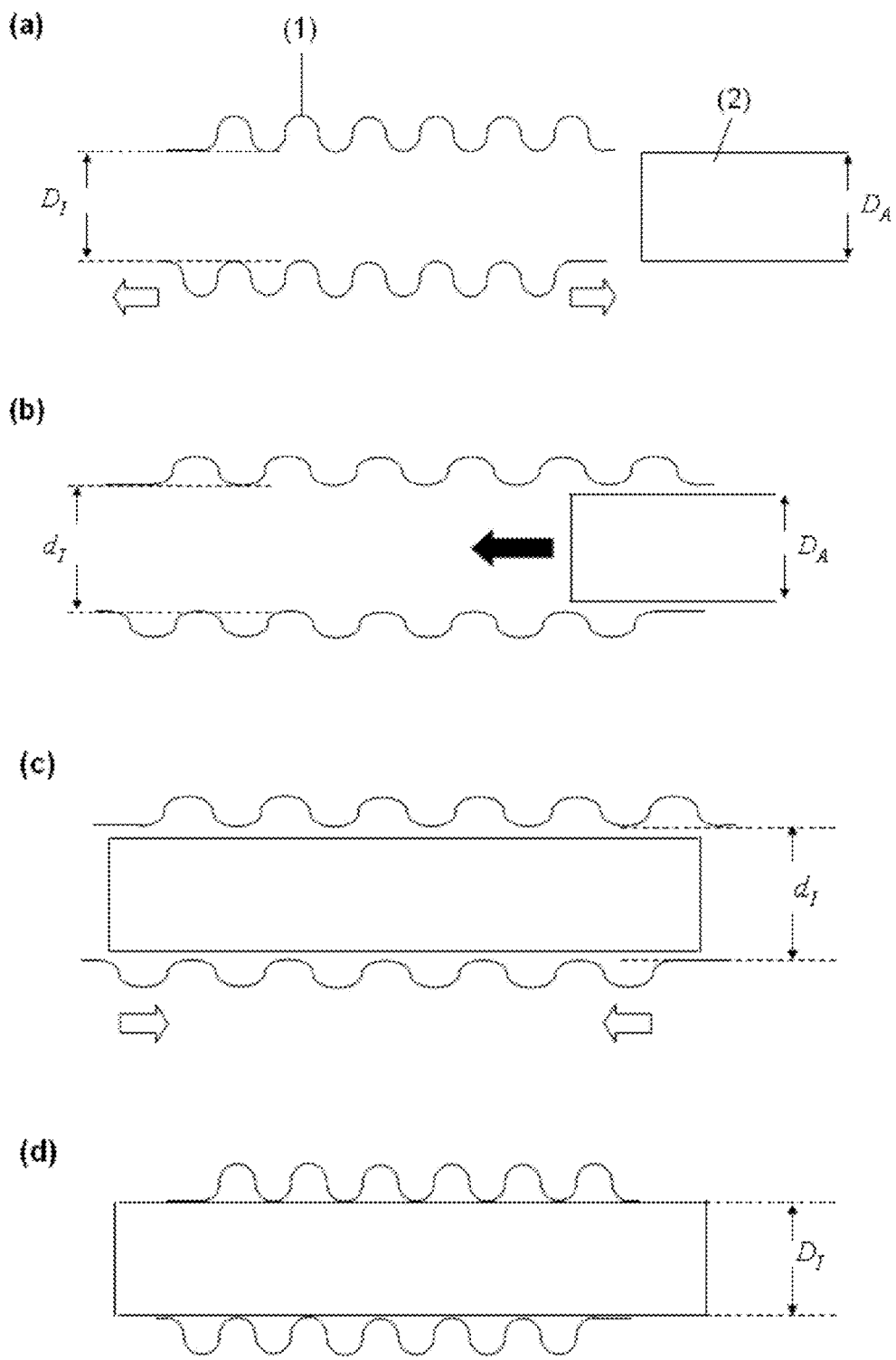
FIG. 4 schematically depicts the method according to the invention of mounting elastic, profiled hollow cylinders (1) onto a cylindrical element (2).
Figure 5:
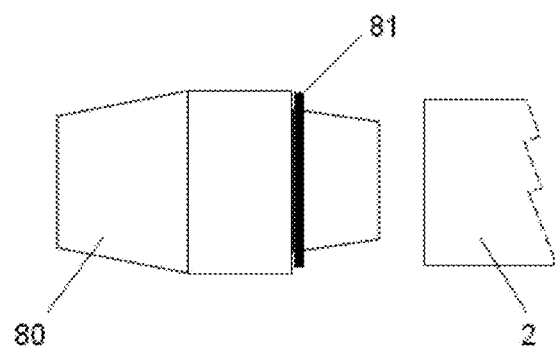
FIG. 5 schematically depicts an example of a centering device or insertion aid for facilitating the insertion of the cylindrical element into the elongated hollow cylinder and for preventing damage. In the present example the cylindrical element (2) is a glass tube. The centering device (80) is fitted onto this glass tube. A rubber ring (81) ensures that the glass tube is not damaged. The conical tip of the centering device facilitates the insertion. The centering device is depicted from the side in FIG. 5, view (a) and from the side facing the glass tube in FIG. 5, view (b).
Figure 5:
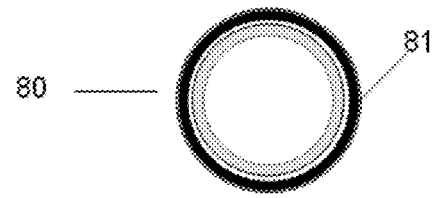
Figure 6A:
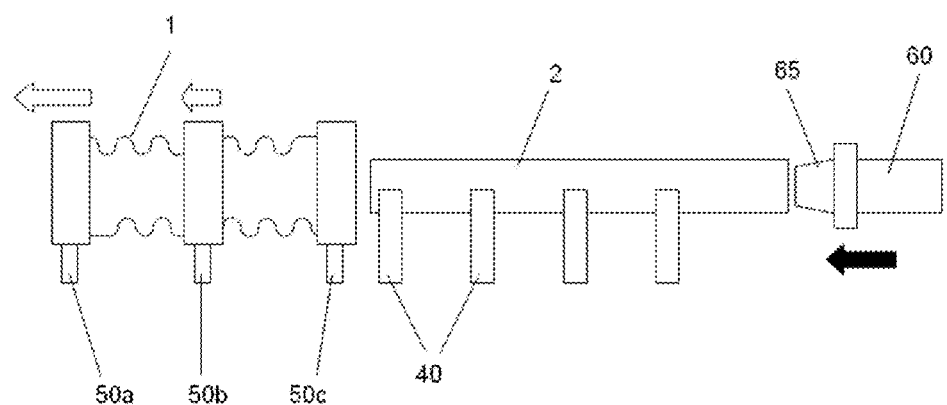
FIG. 6a schematically depicts, from the side, an example of a device according to the invention for mounting a profiled hollow cylinder (1) onto a cylindrical element (2). The cylindrical element is designed as a tube in the present example. The device includes four supports (40) for holding and guiding the tube, a pushing rod (60) with a conical tip (65) for pushing the tube into the hollow cylinder and three gripping elements (50a, 50b, 50c). In the present example gripping element (50c) is restrained, whereas gripping elements (50a) and (50b) are movable and are moved away from gripping element (50c) by a driving unit while stretching the hollow cylinder. In order to ensure that the stretching takes place uniformly over the entire length of the hollow cylinder, gripping element (50a) must move away from element (50c) twice as quickly as gripping element (50b). Where stepping motors are used, for each step by which gripping element (50b) moves away from element (50c), gripping element (50a) must move two steps in the same direction. This is indicated by the white arrows of different lengths above the gripping elements. Relaxation takes place analogously.
Figure 6B:
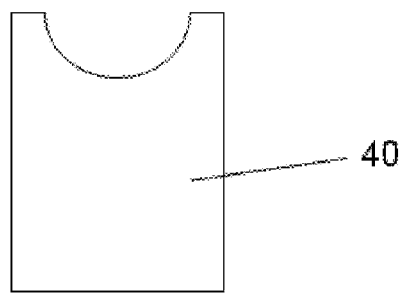
FIG. 6b schematically depicts a support (40) from FIG. 6a from the front.
Figure 6C:
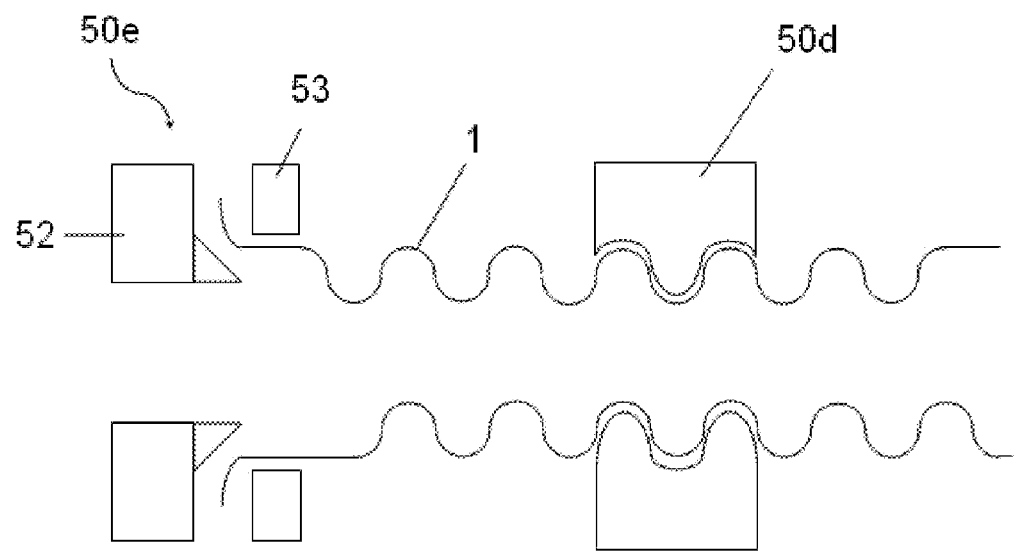
FIG. 6c depicts schematically and by way of example cross-sections of two different types of gripping elements (50d, 50e). Gripping element (50e) is used for gripping a profiled hollow cylinder (1) at one of its ends. It includes a ring (52) with a conical guiding piece for reaching into the hollow cylinder and an additional ring (53). The collar at the end of the profiled hollow cylinder is clamped between rings (52) and (53) for example by means of a screw connection (not shown in the figure).
Figure 6D:
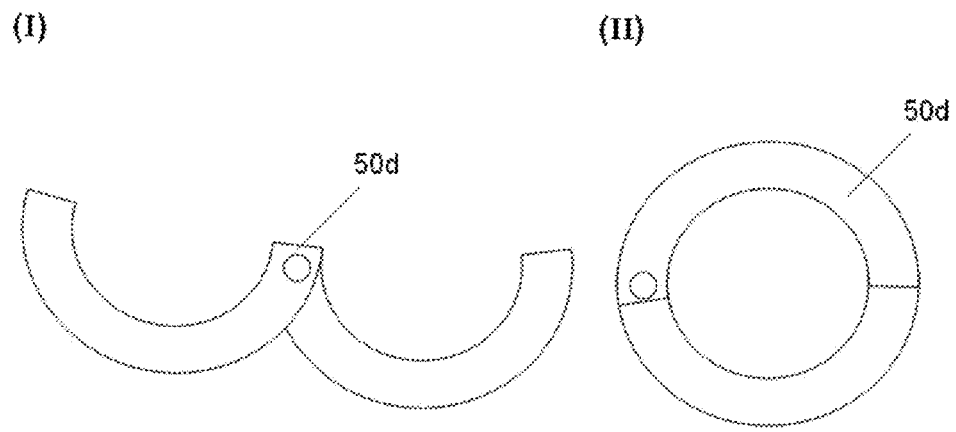

FIG. 6*d* schematically depicts gripping element (50*d*) from the front. In the above description this element is also referred to as a matrix. It consists of two semicircularly shaped elements connected to each other by means of a hinge. In FIG. 6*d* (I) the element is opened and can receive a hollow cylinder. In FIG. 6*d* (II) the element is closed. The open ends of the semicircular elements can, for example, be joined to each other by means of screw connections (not shown in the figure), in order to prevent any undesired opening and/or sliding out of the gripped hollow cylinder.

Figure 7:
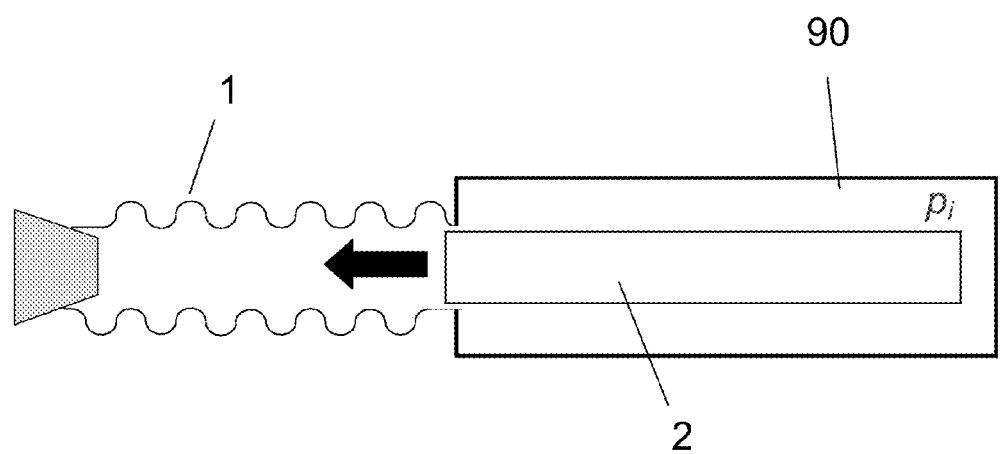

FIG. 7 depicts schematically how the interior of the profiled hollow cylinder can be placed under an increased pressure $p_i$ in order to additionally facilitate the insertion of the tube. This embodiment can cause a sufficient increase in the inner diameter of the profiled hollow cylinder either by itself or in combination with an elongation of the profiled hollow cylinder.

REFERENCE NUMERALS

1 profiled hollow cylinder
2 cylindrical element
3 profiled contour
20 spiral channel
40 support
50*a* fixed gripping element
50*b* movable gripping element
50*c* movable gripping element
50*d* central gripping element=matrix
50*e* end fixing element
52 ring with a conical guiding piece
53 ring
60 pushing rod
65 conical tip
80 centering device/insertion aid
81 rubber ring
90 pressure chamber

The invention claimed is:

1. A device for mounting a flexible, profiled hollow cylinder onto a cylindrical element comprising at least means for gripping the profiled hollow cylinder at one or more points, means for stretching the profiled hollow cylinder along its longitudinal axis to elongate the profiled hollow cylinder by from 1% to 30%, whereby the smallest inner diameter of the profiled hollow cylinder is increased in size, and means for inserting the cylindrical element into the elongated hollow cylinder, and then allowing the hollow cylinder to relax, whereby the length of the stretched profiled hollow cylinder decreases and the smallest inner diameter decreases.

2. A device according to claim 1, wherein the gripping means comprise at least two gripping elements which hold the hollow cylinder at both ends and of which at least one gripping element is movable, so that the gripping elements can be moved relatively away from each other while elongating the hollow cylinder.

3. A device according to claim 2, wherein the means for gripping the hollow cylinder comprise more than two gripping elements which are distributed uniformly over the length of the hollow cylinder and can move relatively away from each other.

4. A device according to claim 1, further comprising means for adjusting the elongated hollow cylinder in relation to the cylindrical element.

5. A device according to claim 1, further comprising temperature control means for the hollow cylinder.

* * * * *